US011502998B2

(12) United States Patent
Nagarajan et al.

(10) Patent No.: US 11,502,998 B2
(45) Date of Patent: Nov. 15, 2022

(54) METHODS AND SYSTEMS FOR PROVISIONING AND MANAGING INTERNET-OF-THING DEVICES OVER A NETWORK

(71) Applicant: HEWLETT PACKARD ENTERPRISE DEVELOPMENT LP, Houston, TX (US)

(72) Inventors: Sivasankaran Nagarajan, Bangalore (IN); Sudhir kumar Chimakurthy, Bengaluru (IN); Feroz Ahmed, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 815 days.

(21) Appl. No.: 15/999,510

(22) Filed: Aug. 20, 2018

(65) Prior Publication Data
US 2019/0334865 A1    Oct. 31, 2019

(30) Foreign Application Priority Data

Apr. 30, 2018    (IN) .............................. 201841016314

(51) Int. Cl.
*H04L 29/06*    (2006.01)
*H04L 9/40*    (2022.01)
*H04L 12/46*    (2006.01)

(52) U.S. Cl.
CPC ........ *H04L 63/029* (2013.01); *H04L 12/4641* (2013.01); *H04L 63/0272* (2013.01); *H04L 63/0876* (2013.01)

(58) Field of Classification Search
CPC ............. H04L 12/4641; H04L 63/0272; H04L 63/029; H04L 63/0876
See application file for complete search history.

(56) References Cited

U.S. PATENT DOCUMENTS 7,266,595 B1    9/2007    Black et al.
7,724,704 B2    5/2010    Simons et al.
(Continued)

FOREIGN PATENT DOCUMENTS

CN    101616372 A    12/2009
CN    107736047 A    2/2018
WO    WO-2017219148    12/2017

OTHER PUBLICATIONS

The Control System | The Brain in an IoT Device, (Web Page), Retrieved Feb. 28, 2018, 4 Pgs.
(Continued)

*Primary Examiner* — Jeffrey C Pwu
*Assistant Examiner* — Thong P Truong
(74) *Attorney, Agent, or Firm* — Sheppard Mullin Richter & Hampton LLP (57) ABSTRACT

Methods for provisioning and managing Internet-of-Things (IoT) devices over a network using device based tunneled nodes are provided. In one aspect, a method includes receiving, by a first network device in a network, data originated from an Internet-of-Things (IoT) device; identifying a device type of the IoT device by analyzing data packets of the received data; obtaining, by the first network device, a device profile for the IoT device, wherein the device profile is used for provisioning the IoT device to access the network; and provisioning the IoT device using the device profile, wherein the provisioning includes at least one of (1) identifying a tunneling attribute in the device profile; and (2) identifying a constrained application protocol (CoAP) parameter in the device profile, wherein the CoAP parameter is used to zero touch provision one or more device attributes of the IoT device. Systems and machine-readable media are also provided.

20 Claims, 5 Drawing Sheets

(56) References Cited

U.S. PATENT DOCUMENTS

| | | |
|---|---|---|
| 9,565,192 B2 | 2/2017 | Chillappa et al. |
| 9,634,928 B2 | 4/2017 | Choudhury et al. |
| 2010/0100616 A1 | 4/2010 | Bryson et al. |
| 2014/0289366 A1 | 9/2014 | Choi et al. |
| 2016/0036634 A1 | 2/2016 | PalChaudhuri et al. |
| 2016/0164728 A1* | 6/2016 | Chakrabarti ........ H04L 41/0806 370/254 |
| 2016/0234628 A1 | 8/2016 | Rahman et al. |
| 2016/0381030 A1* | 12/2016 | Chillappa ............... H04W 4/70 726/11 |
| 2017/0149614 A1 | 5/2017 | Zheng et al. |
| 2017/0187699 A1 | 6/2017 | Gillmore et al. |
| 2017/0201504 A1 | 7/2017 | Funk |
| 2019/0065352 A1* | 2/2019 | Patel ................... G06F 11/3688 |

OTHER PUBLICATIONS

Extended European Search Report and Written Opinion received for Applicatin No. 18183266.8, dated Oct. 16, 2018, 10 pages.

\* cited by examiner

METHODS AND SYSTEMS FOR PROVISIONING AND MANAGING INTERNET-OF-THING DEVICES OVER A NETWORK

CROSS-REFERENCE TO RELATED APPLICATIONS

This application claims priority to Indian Patent Application No. 201841016314 filed on Apr. 30, 2018, the entire contents of which are incorporated by reference herein.

TECHNICAL FIELD

The present disclosure generally relates to networking, and more specifically relates to methods and systems for provisioning and managing Internet-of-Things (IoT) devices over a network using device based tunneled nodes.

BACKGROUND

Many modern devices such as, for example, heat sensors, smart light bulbs, smart kitchen devices, printers, cameras, and other smart devices are embedded with a computing system that enables these smart devices to connect and exchange data over the internet. These smart devices are commonly referred to as Internet-of-Things devices. While other types of devices such as, for example, laptops and mobile phones support sophisticated security protocols for connecting to the internet, many IoT devices are power constrained and cannot support such security protocols. As such, some IoT devices may become compromised and vulnerable to personification attacks. Some prior management techniques have addressed potential security issues of the IoT devices by manually configuring a device specific identity, such as a media access control (MAC) address, for such IoT devices. Other prior techniques involve assigning specific Virtual Local Area Network (VLAN) to such security vulnerable IoT devices, which requires using complex protocols like Locator/ID Separation Protocol (LISP) and Virtual Extensible Local Area Network (VXLAN). With the growing number of IoT devices being connected to the internet, however, it is increasingly more challenging to provision, monitor, and manage these IoT devices on such a large term scale.

The description provided in the background section should not be assumed to be prior art merely because it is mentioned in or associated with the background section. The background section may include information that describes one or more aspects of the subject technology.

SUMMARY

The disclosed system provides for tunneling data between two network devices. A first network device in a network receives data originated from an Internet-of-Things (IoT) device and identifies a device type of the IoT device by analyzing data packets of the received data. The first network device also obtains a device profile for the IoT device. The device profile is used for provisioning the IoT device to access the network. The first network device also provisions the IoT device using the device profile. The provisioning includes at least one of (1) identifying a tunneling attribute in the device profile and (2) identifying a constrained application protocol (CoAP) parameter. Moreover, the disclosed system provides zero touch provisioning (ZTP) for the IoT device.

According to certain aspects of the present disclosure, a computer-implemented method is provided. The method includes receiving, by a first network device in a network, data originated from an Internet-of-Things (IoT) device. The method further includes identifying a device type of the IoT device by analyzing data packets of the received data. The method even further includes obtaining, by the first network device, a device profile for the IoT device. The device profile is used for provisioning the IoT device to access the network. The method yet even further includes provisioning the IoT device using the device profile, wherein the provisioning includes at least one of (1) identifying a tunneling attribute in the device profile, wherein the tunneling attribute is used to create a tunnel between the first network device and a second network device for transmitting the data received from the IoT device; and (2) identifying a constrained application protocol (CoAP) parameter in the device profile, wherein the CoAP parameter is used to zero touch provision one or more device attributes of the IoT device.

According to further aspects of the present disclosure, a system is provided. The system includes a memory having instructions. The system further includes one or more processors configured to execute the instructions to receive, by a network switch in a network, data originated from an Internet-of-Things (IoT) device. The one or more processors is further configured to execute the instructions to identify a type of the IoT device by analyzing data packets of the received data. The one or more processors is even further configured to execute the instructions to obtain, by the network switch, a device profile for the IoT device. The device profile is used for provisioning the IoT device to access the network. The one or more processors is yet even further configured to execute the instructions to provision the IoT device using the device profile, wherein provisioning the IoT device includes at least one of (1) identifying a tunneling attribute in the device profile, wherein the tunneling attribute is used to create a tunnel between the network switch and a network controller for transmitting the data received from the IoT device, or (2) identifying a constrained application protocol (CoAP) parameter in the device profile, wherein the CoAP parameter is used to zero touch provision one or more device attributes of the IoT device.

According to even further aspects of the present disclosure, a non-transitory machine-readable storage medium is provided. The non-transitory machine-readable storage medium includes receiving, by a network switch in a network, data originated from an Internet-of-Things (IoT) device. The non-transitory machine-readable storage medium further includes identifying a type of the IoT device by analyzing data packets of the received data. The non-transitory machine-readable storage medium yet further includes obtaining, by the network switch, a device profile for the IoT device. The device profile is used for provisioning the IoT device to access the network. The non-transitory machine-readable storage medium even further includes provisioning the IoT device using the device profile, wherein provisioning the IoT device includes at least one of (1) identifying a tunneling attribute in the device profile, wherein the tunneling attribute is used to create a tunnel between the network switch and a network controller for transmitting the data received from the IoT device; and (2) identifying a constrained application protocol (CoAP) parameter in the device profile, wherein the CoAP parameter is used to zero touch provision one or more device attributes of the IoT device. The non-transitory machine-readable storage medium yet even further includes transmitting, by the network switch to the network controller, a request to create the tunnel between the network switch and the network controller for transmitting the data from the IoT device. The non-transitory machine-readable storage medium further yet includes receiving, by the network switch from the network controller, a confirmation that the tunnel between the network switch and the network controller for transmitting the data from the IoT device has been created. The non-transitory machine-readable storage medium even further yet includes transmitting the data received from the IoT device from the network switch to the network controller using the tunnel.

According to yet even further aspects of the present disclosure, a system is provided. The system includes a means for receiving data originated from an Internet-of-Things (IoT) device. The means for receiving data also identifies a device type of the IoT device by analyzing data packets of the received data. The means for receiving data also obtains a device profile for the IoT device. The device profile is used for provisioning the IoT device to access the network. The means for receiving data also provisions the IoT device using the device profile, wherein the provisioning includes at least one of (1) identifying a tunneling attribute in the device profile, wherein the tunneling attribute is used to create a tunnel between the first network device and a second network device for transmitting the data received from the IoT device; and (2) identifying a constrained application protocol (CoAP) parameter in the device profile, wherein the CoAP parameter is used to zero touch provision one or more device attributes of the IoT device. The system also includes a means for, responsive to receiving a request from the network switch to create a tunnel, transmitting a confirmation to the network switch after the tunnel is created. The means for transmitting the confirmation also receives, from the network switch via the tunnel, the data received from the IoT device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for provisioning and managing Internet-of-Things devices over a network using device based tunneled nodes. In some embodiments, the disclosed system further provides zero touch provisioning (ZTP) for the IoT device.

The disclosed system addresses a technical problem tied to computer technology and arising in the realm of computer networks, namely the technical problem of leveraging the power constraints of IoT devices to provision and manage IoT devices for supporting network security protocols. The disclosed system solves this technical problem by simplifying deployments for large scale of IoT devices by automating provisioning of IoT devices using device profiles in network switches. Moreover, the disclosed system further simplifies configuration and management of IoT devices with ZTP via a centralized IoT device provisioning server such as a network management server (NMS). For example, the ZTP for the IoT device includes automatically provisioning or configuring one or more device attributes of the IoT device without requiring any manual intervention. In certain aspects, a CoAP parameter includes, for example, a CoAP uniform resource identifier (URI), such as "coap://[device-ip]/sensor/threshold value 10."

Furthermore, the disclosed system provides more reliability of provisioning or configuring IoT devices by terminating user datagram protocol (UDP) based CoAP protocol packets and implementing to more reliable transmission control protocol (TCP) packets. Additionally, the disclosed system adds security to such TCP packets by transporting them over Hypertext Transfer Protocol Secure (HTTPS) protocol.

Example System Architecture

Figure 1:
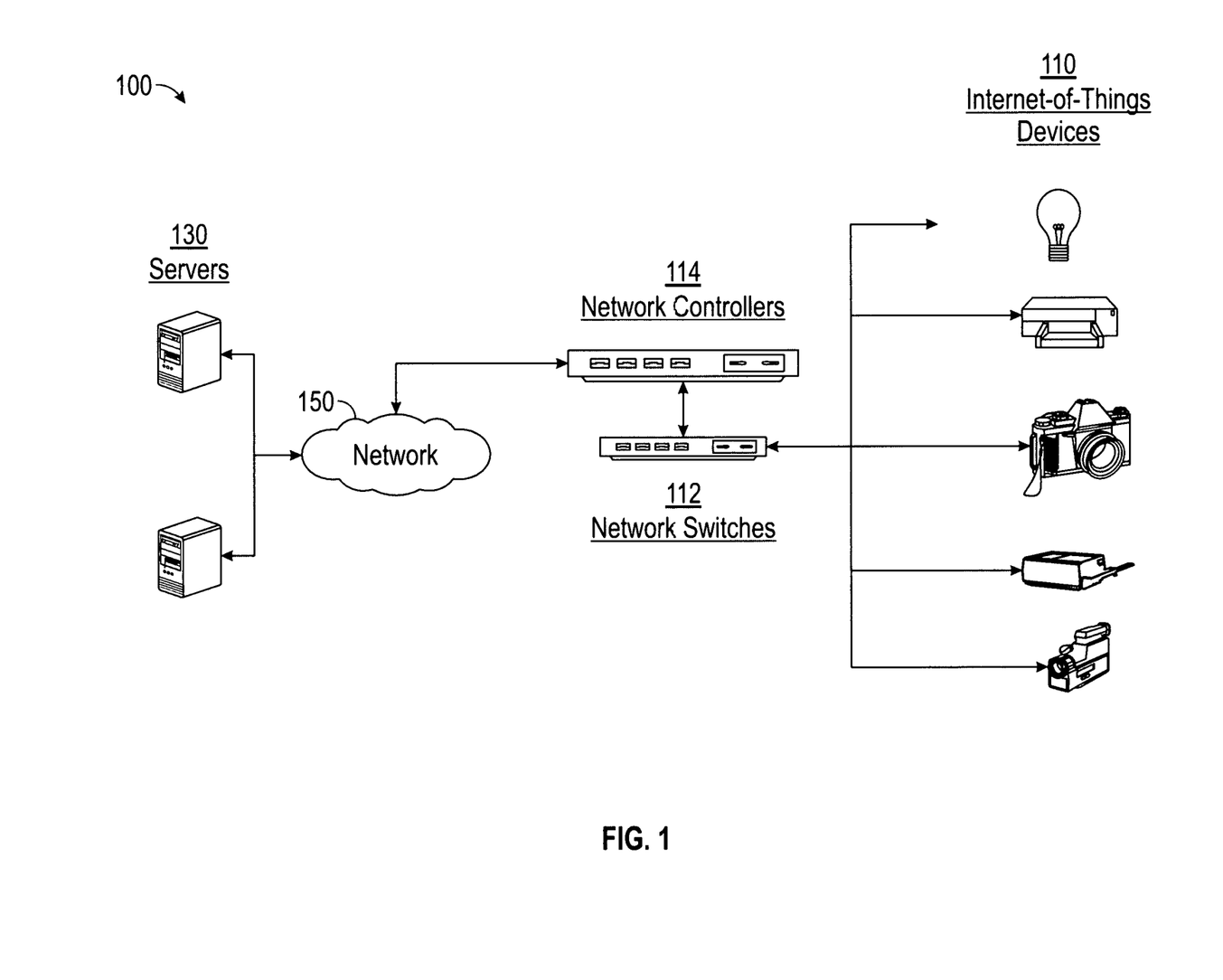
FIG. 1 illustrates an example architecture for provisioning and managing Internet-of-Things (IoT) devices over a network using device based tunneled nodes.

FIG. 1 illustrates an example architecture 100 for provisioning and managing Internet-of-Things (IoT) devices over a network using device based tunneled nodes. The architecture 100 includes IoT devices 110, network switches 112, network controllers 114, and servers 130 connected over a network 150.

One of the many servers 130 is configured to host a device profile database. For purposes of load balancing, multiple servers 130 can host the device profile database. As discussed herein, the server 130 is a central management server such as, for example, a network management server (NMS).

The disclosed system provisions and manages the IoT devices 110 over the network 150 using device based tunneled nodes. For example, after receiving data from the IoT device 110, the network switch 112 identifies the device type of the IoT device 110 and obtains a device profile for the IoT device. In some aspects, the network switch 112 obtains the device profile by retrieving the device profile from storage in a memory (238) of the network switch 112. In other aspects, the network switch 112 obtains the device profile by downloading from the device profile database (228) of the server 130, such as the NMS, via a secure networking protocol such as Hypertext Transfer Protocol Secure (HTTPS) protocol.

The servers 130 can be any device having an appropriate processor, memory, and communications capability for hosting device profile databases. The IoT devices 110 to which the servers 130 are connected over the network 150 can be, for example, heat sensors, smart light bulbs, smart kitchen devices, printers, cameras, or any other devices having appropriate embedded processor, memory, and communications capabilities. In certain aspects, one or more of the servers 130 can be a cloud computing server of an infrastructure-as-a-service (IaaS) and be able to support a platform-as-a-service (PaaS) and software-as-a-service (SaaS) services.

Figure 2:
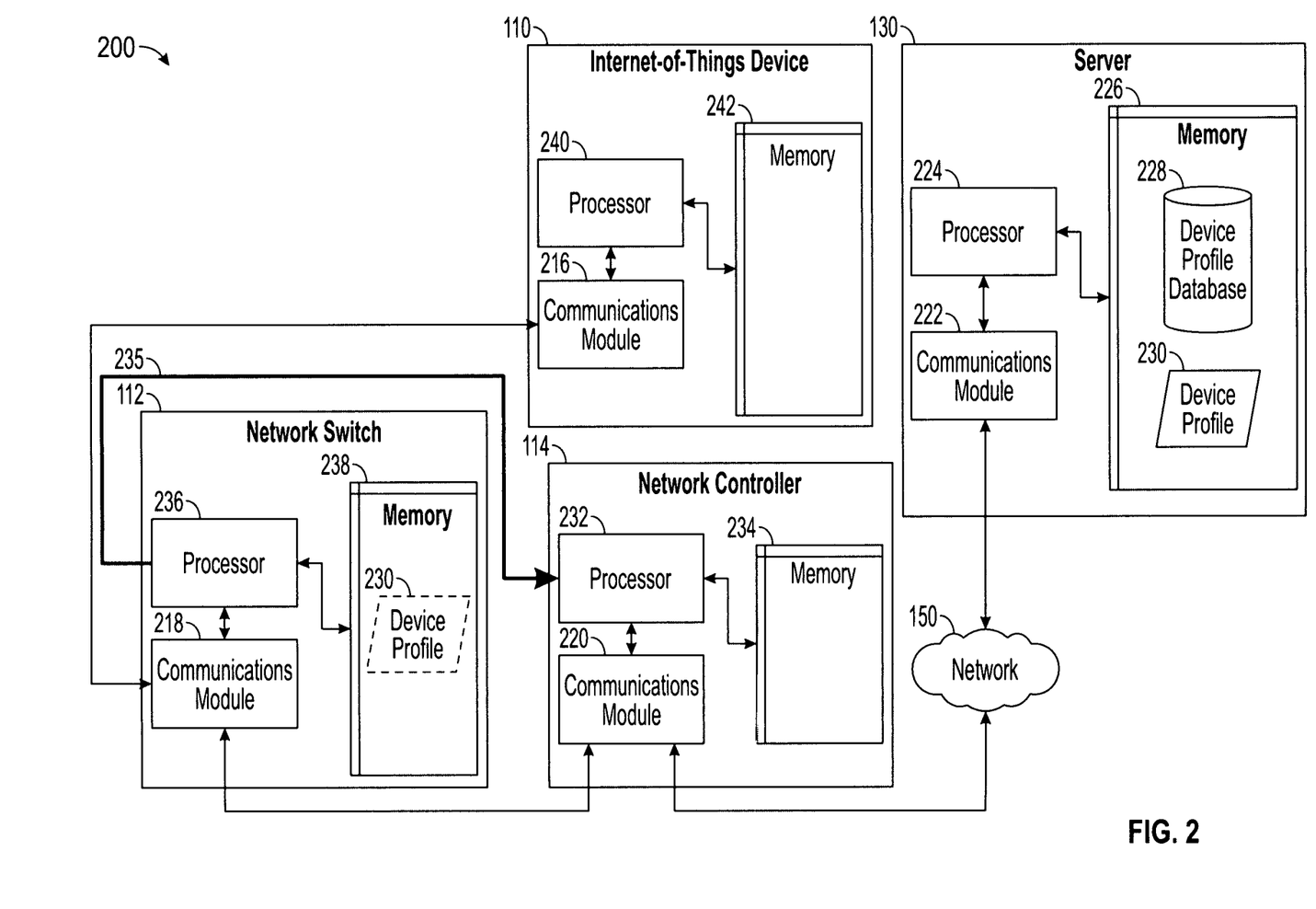
FIG. 2 is a block diagram illustrating the example IoT device, the network switch, the network controller, and the server from the architecture of FIG. 1 according to certain aspects of the disclosure.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.
Example System for Provisioning and Managing IoT Devices over a Network FIG. 2 is a block diagram illustrating an example IoT device 110, network switch 112, network controller 114, and server 130 in the architecture 100 of FIG. 1 according to certain aspects of the disclosure.

The IoT device 110, the network switch 112, the network controller 114, and the server 130 are connected over the network 150 via respective communications modules 216, 218, 220, and 222. While communication module 216 is configured to interface with communications module 218, which is configured to interface with communications module 220, the communications modules 220 and 222 are configured to interface with the network 150 to send and receive information, such as data, requests, responses, and commands to other devices on the network. The communications modules 216, 218, 220, and 222 can be, for example, modems or Ethernet cards.

The server 130 includes a processor 224, the communications module 222, and a memory 226 that includes a device profile database 228. The processor 224 of the server 130 is configured to execute instructions, such as instructions physically coded into the processor 224, instructions received from software in memory 226, or a combination of both. For example, the processor 224 of the server 130 executes instructions, responsive to receiving a REpresentational State Transfer (REST) query from the network switch 112, to transmit a device profile 230 to the network switch 112.

The network controller 114, for example a wireless local access network (WLAN) controller, includes a processor 232, the communications module 220, and a memory 234. The processor of the network controller 114 is configured to execute instructions, such as instructions physically coded into the processor 232, instructions received from software in memory 234, or a combination of both. For example, the processor 232 of the network controller 114 executes instructions, responsive to receiving a request from the network switch 112 to create a tunnel 235, to transmit a confirmation to the network switch 112 after the tunnel 235 is created. The processor 232 of the network controller 114 also executes instructions to receive, from the network switch 112 via the tunnel 235, the data received from the IoT device 110.

The network switch 112 includes a processor 236, the communications module 218, and a memory 238. In certain aspects, the network switch 112 is deployed at an edge segment of the network 150. The processor of the network switch 112 is configured to execute instructions, such as instructions physically coded into the processor 236, instructions received from software in memory 238, or a combination of both. For example, the processor 236 of the network switch 112 executes instructions to receive data originated from the IoT device 110 and identify a device type of the IoT device 110 by analyzing data packets of the received data. The processor 236 of the network switch 112 also executes instructions to obtain a device profile, such as the device profile 230. In certain aspects, the instruction to obtain the device profile 230 includes instructions to retrieve the device profile 230 from storage of its memory 238. Additionally or alternatively, however, if there is no matching device profile in storage of the memory 238 of the network switch 112, then the processor 236 executes instructions to transmit the REST query to the server 130, such as the NMS, via a secure networking protocol, such as HTTPS protocol, and download the device profile 230 from the device profile database 228 of the server 130 via the secure networking protocol. The device profile 230 is illustrated in phantom in the memory 238 of the network switch 112 to depict instances when the device type of the IoT device 110 does not match any device profile from storage in the memory 238.

The processor 236 of the network switch 112 also executes instructions to provision the IoT device 110 by using the device profile 230 to either (1) identify a tunneling attribute in the device profile 230 or (2) identify a constrained application protocol (CoAP) parameter in the device profile. The tunneling attribute in the device profile 230 is used to create the tunnel 235 between the network switch 112 and the network controller 114 for transmitting the data received from the IoT device 110. The CoAP parameter is used to establish a CoAP connection to the IoT device. In certain aspects, the instructions to provision the IoT device 110 by using the device profile 230 further includes the instructions to configure the IoT device 110 to communicate over the network 150 via the network switch 112 and the network controller 114. In certain other aspects, the instructions to identify the tunneling attribute further include instructions to add the tunneling attribute to the device profile 230. In certain further aspects, the tunneling attribute includes a device-tunneled-redirect instruction for creating the tunnel 235 between the network switch 112 and the network controller 114.

The IoT device 110 includes a processor 240, the communications module 216, and a memory 242. The processor 240 of the IoT device 110 is configured to execute instructions, such as instructions physically coded into the processor 240, instructions received from software in memory 242, or a combination of both. For example, the processor 240 of the IoT device 110 executes instructions to transmit data, including data packets, to the network switch 112.

In certain aspects, the processor 236 of the network switch 112 also executes instructions to transmit, to the network controller 114, a request to create the tunnel 235 between the network switch 112 and the network controller 114 for transmitting the data from the IoT device 110. The processor 236 of the network switch 112 also executes instructions to receive, from the network controller 114, a confirmation that the tunnel 235 between the network switch 112 and the network controller 114 for transmitting the data from the IoT device 110 has been created. Moreover, the processor 236 of the network switch 112 executes instructions to transmit the data received from the IoT device 110 from the network switch 112 to the network controller 114 using the tunnel 235.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
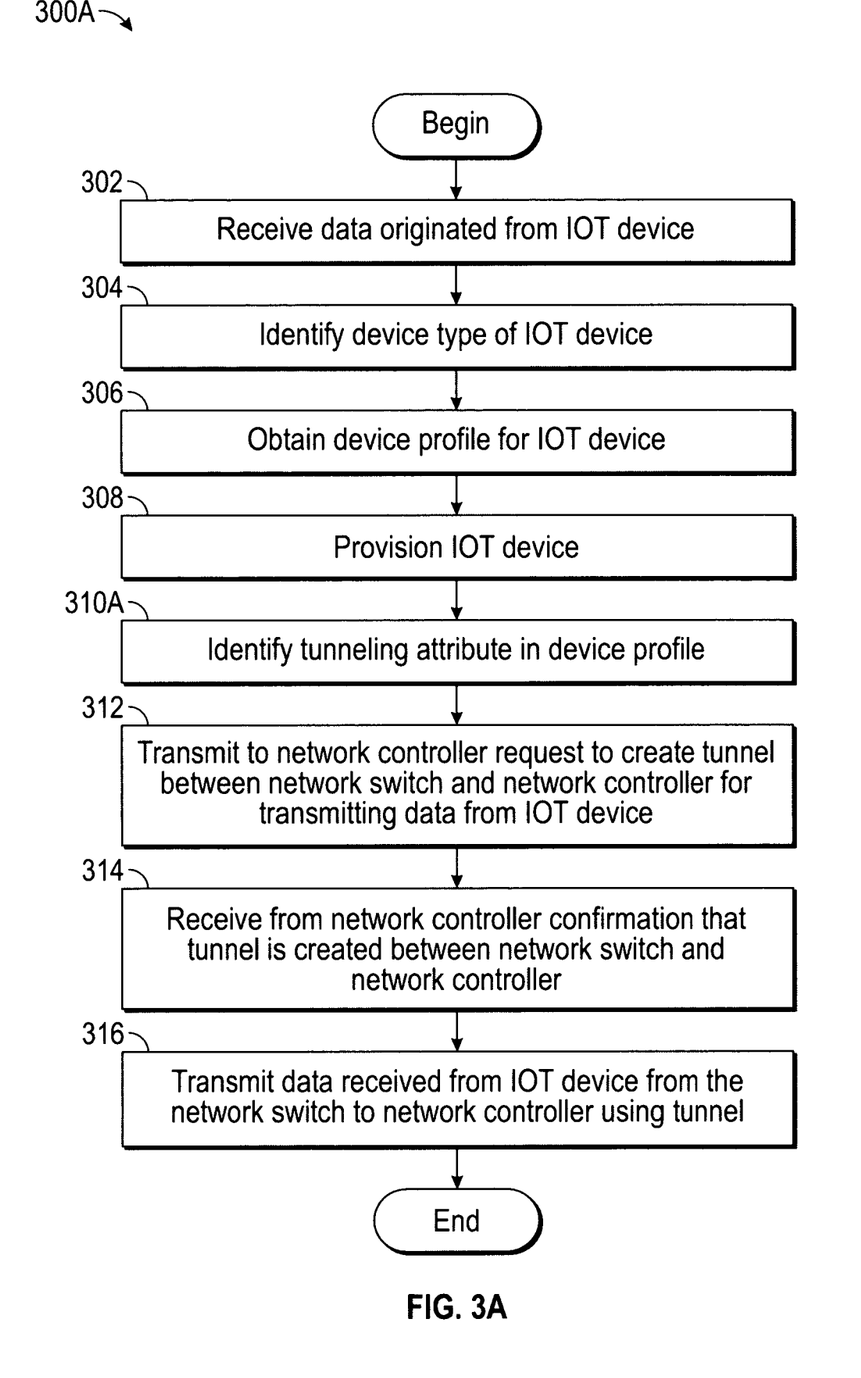
FIG. 3A illustrates an example process for provisioning and managing Internet-of-Things (IoT) devices over a network using device based tunneled nodes using the example IoT device, the network switch, the network controller, and the server of FIG. 2.

FIG. 3A illustrates an example process 300A for provisioning and managing IoT devices 110 over the network 150 using device based tunneled nodes of FIG. 2. While FIG. 3A is described with reference to FIG. 2, it should be noted that the process steps of FIG. 3A may be performed by other systems.

The process 300A begins by proceeding to step 302 when the network switch 112 receives data originated from the IoT device 110. Next in step 304, the network switch 112 identifies the device type of the IoT device 110 by analyzing data packets of the received data from the IoT device 110. At step 306, the network switch 112 obtains the device profile 230 for the IoT device 110. The device profile 230 is used for provisioning the IoT device 110 to access the network 150. In certain aspects, the network switch 112 obtains the device profile 230 by retrieving the device profile 230 from storage in the memory 238 of the network switch 112. Additionally or alternatively, if there is no matching device profile in storage of the memory 238 of the network switch 112, then the network switch 112 transmits the REST query to the server 130, such as the NMS, via a secure networking protocol, such as HTTPS protocol, and downloads the device profile 230 from the device profile database 228 of the server 130 via the secure networking protocol.

Moving to step 308, the network switch 112 provisions the IoT device 110 by using the device profile 230. As depicted at step 310A, the provisioning of the IoT device 110 includes identifying the tunneling attribute in the device profile 230. The tunneling attribute is used to create the tunnel 235 between the network switch 112 and the network controller 114 for transmitting the data received from the IoT device 110. Next, in step 312, the network switch 112 transmits to the network controller 114 the request to create the tunnel 235 between the network switch 112 and the network controller 114 for transmitting the data from the IoT device 110. In step 314, the network switch 112 receives from the network controller 114 the confirmation that the tunnel 235 is created between the network switch 112 and the network controller 114. The process 300A then proceeds to step 316 where the network switch 112 transmits the data received from the IoT device 110 from the network switch 112 to the network controller 114 using the tunnel 235 and the process 300A ends.

As an example, the IoT device 110, such as a smart bulb, is coupled to the network switch 112. The network switch 112 will then receive data in step 302 from the smart bulb and identify, in step 304, the device type of the smart bulb by analyzing the data packets of the data received from the smart bulb (i.e., device fingerprinting). The data packets may be, but are not limited to, a Media Access Control (MAC) address, a Link Layer Discovery Protocol (LLDP), a Cisco Discovery Protocol (CDP), a Dynamic Host Discovery Protocol (DHCP), a Hypertext Transfer Protocol Secure (HTTPS) user-agents, multicast Domain Name System (mDNS), and other well-known protocol packets. After the network switch 112 identifies the device type of the smart bulb, the network switch 112 will obtain the device profile 230 for the smart bulb in step 306.

In some aspects, the network switch 112 obtains the device profile 230 for the smart bulb by retrieving the device profile 230 from storage in the memory 238 of the network switch 112. If the device profile 230 is not found in the memory 238, then the network switch 112 obtains the device profile 230 for the smart bulb by downloading the device profile 230 from the device profile database 228 of the server 130, such as the NMS, via a secure networking protocol such as Hypertext Transfer Protocol Secure (HTTPS) protocol. Alternatively, in other aspects, the network switch 112 will initially download the device profile 230 from the device profile database 228 of the server 130 instead of attempting to retrieve the device profile 230 from the memory 238.

With the device profile 230 of the smart bulb, the network switch 112 will then provision the smart bulb, in step 308, by identifying the tunneling attribute in the device profile 230, in step 310A, and transmitting a request to the network controller 114, in step 312, to create a tunnel 235 between the network switch 112 and the network controller 114 for transmitting the data from the smart bulb. After the tunnel 235 is created, the network switch 112 receives a confirmation from the network controller 114, in step 314, that the tunnel 235 is created between the network switch 112 and the network controller 114. With the tunnel 235 created, the network switch 112 transmits the data received from the smart bulb over the tunnel 235 to the network controller 114 in step 316.

Figure 3B:
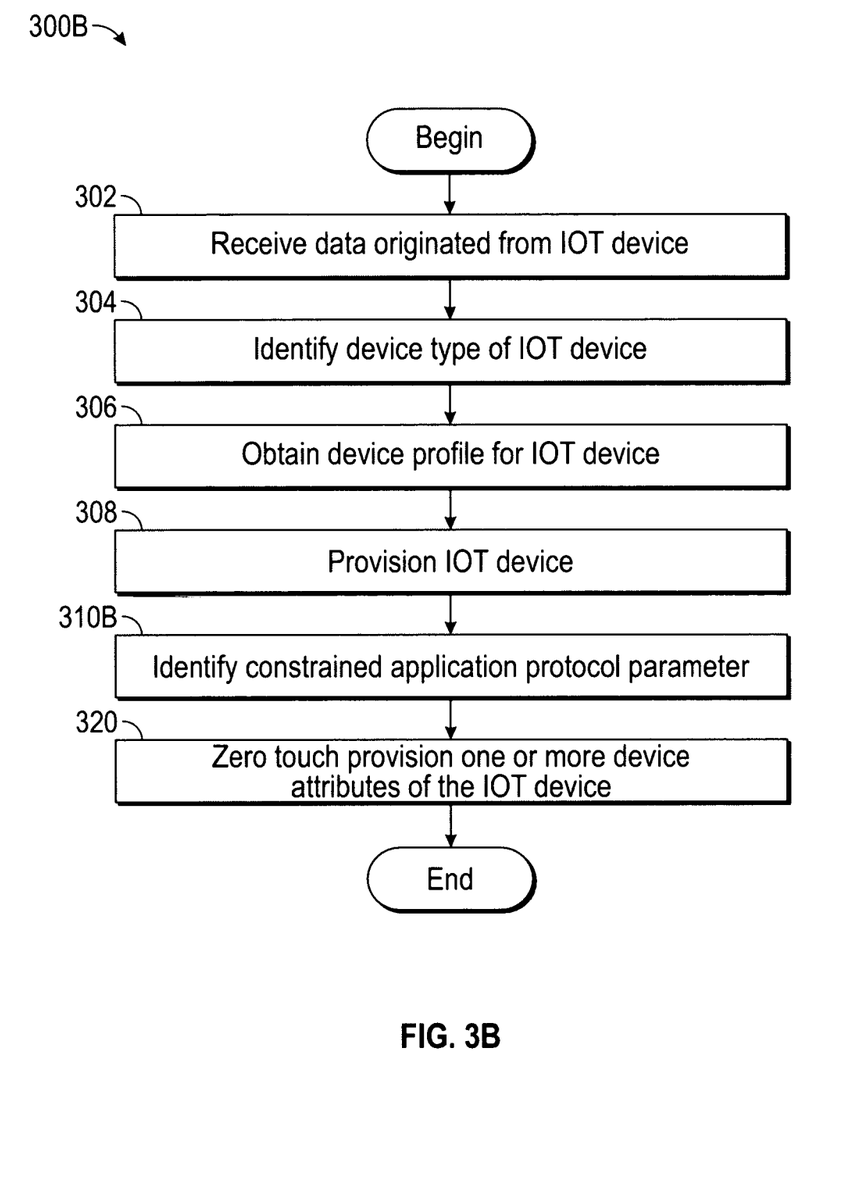
FIG. 3B illustrates another example process for provisioning and managing Internet-of-Things (IoT) devices over a network.

FIG. 3B illustrates another example process 300B for provisioning and managing IoT devices 110 over the network 150. The process 300B performs steps 302 to 308 similarly to the process 300A and then proceeds to step 310B instead of step 310A as in process 300A. At step 310B, the provisioning of the IoT device 110, includes identifying the CoAP parameter instead of identifying the tunneling attribute in the device profile 230 of process 300A. At step 320, the network switch 112 establishes the CoAP connection to the IoT device 110 and the process 300B ends.

As an example, the device profile 230 of the IoT device 110, such as the smart bulb, is similarly obtained as in the above example. In process 300B, however, the network switch 112 identifies the constrained application protocol (CoAP) parameter in the device profile 230, in step 310B, and establishes the CoAP connection to the smart bulb in step 320.

Hardware Overview

Figure 4:
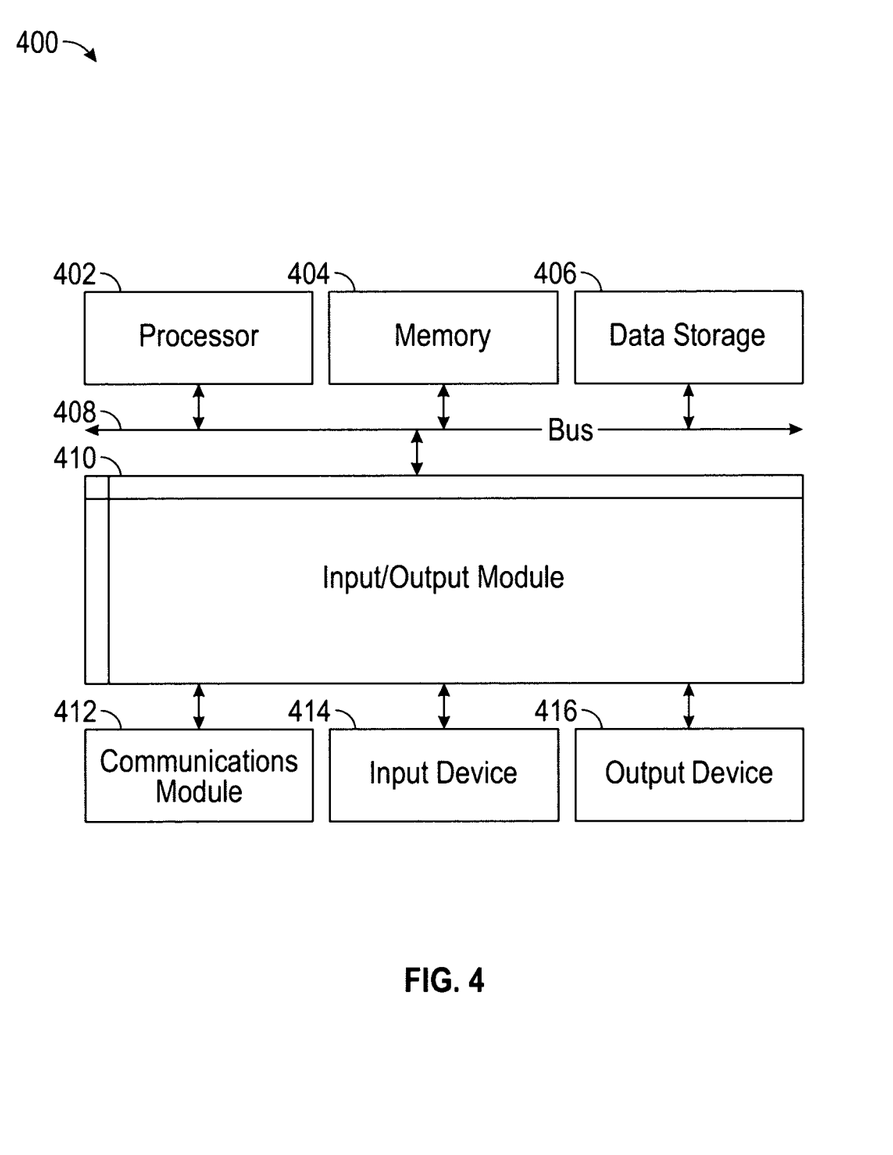
FIG. 4 is a block diagram illustrating an example computer system with which the example IoT device, the network switch, the network controller, and the server of FIG. 2 can be implemented.

FIG. 4 is a block diagram illustrating an example computer system 400 with which the IoT device 110, the network switch 112, the network controller 114, and the server 130 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., the IoT device 110, the network switch 112, the network controller 114, and the server 130) includes a bus 408 or other communication mechanism for communicating information, and a processor 402 (e.g., processors 224,232, 236, and 240) coupled with bus 408 for processing information. According to one aspect, the computer system 400 can be a cloud computing server of an IaaS that is able to support PaaS and SaaS services. According to one aspect, the computer system 400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 400 may be implemented with one or more processors 402. Processor 402 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 226, 234, 238, and 242), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry. Expansion memory may also be provided and connected to computer system 400 through input/output module 410, which may include, for example, a SIMM (Single In Line Memory Module) card interface. Such expansion memory may provide extra storage space for computer system 400, or may also store applications or other information for computer system 400. Specifically, expansion memory may include instructions to carry out or supplement the processes described above, and may include secure information also. Thus, for example, expansion memory may be provided as a security module for computer system 400, and may be programmed with instructions that permit secure use of computer system 400. In addition, secure applications may be provided via the SIMM cards, along with additional information, such as placing identifying information on the SIMM card in a non-hackable manner.

The instructions may be stored in the memory 404 and implemented in one or more computer program products, e.g., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. In addition, input/output module 410 may be provided in communication with processor 402, so as to enable near area communication of computer system 400 with other devices. The input/output module 410 may provide, for example, for wired communication in some implementations, or for wireless communication in other implementations, and multiple interfaces may also be used. The input/output module 410 is configured to connect to a communications module 412. Example communications modules 412 (e.g., 216, 218, 220, and 222) include networking interface cards, such as Ethernet cards and modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 412 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 412 sends and receives electrical, electromagnetic or optical signals that carry digital data streams representing various types of information. The network link typically provides data communication through one or more networks to other data devices. For example, the network link of the communications module 412 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 412, which carry the digital data to and from computer system 400, are example forms of transmission media.

Computer system 400 can send messages and receive data, including program code, through the network(s), the network link and communications module 412. In the Internet example, a server might transmit a requested code for an application program through Internet, the ISP, the local network and communications module 412. The received code may be executed by processor 402 as it is received, and/or stored in data storage 406 for later execution.

In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 416 may include appropriate circuitry for driving the output device 416 to present graphical and other information to a user.

According to one aspect of the present disclosure, the IoT device 110, the network switch 112, the network controller 114, and the server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. Processor 402 may process the executable instructions and/or data structures by remotely accessing the computer program product, for example by downloading the executable instructions and/or data structures from a remote server through communications module 412 (e.g., as in a cloud-computing environment). In alternative aspects, hardwired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that include bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 408. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   receiving, by a first network device in a network, data originated from an Internet-of-Things (IoT) device;
   identifying a device type of the IoT device by analyzing data packets of the received data;
   obtaining, by the first network device, a device profile for the IoT device, the device profile being used for provisioning the IoT device to access the network; and
   provisioning the IoT device using the device profile, wherein the provisioning comprises identifying a tunneling attribute in the device profile and identifying a constrained application protocol (CoAP) parameter in the device profile;
   creating a tunnel using the tunneling attribute, wherein the tunnel is between the first network device and a second network device for transmitting the data received from the IoT device; and
   creating a CoAP connection to the IoT device using the CoAP parameter to establish a zero touch provision on one or more device attributes of the IoT device.

2. The computer-implemented method of claim 1, further comprising:
   transmitting, by the first network device to the second network device, a request to create the tunnel between the first network device and the second network device for transmitting the data from the IoT device;
   receiving, by the first network device from the second network device, a confirmation that the tunnel between the first network device and the second network device for transmitting the data from the IoT device has been created; and
   transmitting the data received from the IoT device from the first network device to the second network device using the tunnel.

3. The method of claim 1, wherein the first network device comprises a network switch and the second network device is a network controller, the network switch deployed at an edge segment of the network.

4. The method of claim 1, wherein obtaining the device profile comprises retrieving the device profile from storage in a memory of the first network device.

5. The method of claim 1, wherein obtaining the device profile comprises downloading the device profile from a device profile database of a central management server via a secure networking protocol.

6. The method of claim 5, wherein downloading the device profile comprises transmitting a REpresentational State Transfer (REST) query to the central management server via the secure networking protocol.

7. The method claim 6, wherein the secure networking protocol is a Hypertext Transfer Protocol Secure (HTTPS) protocol.

8. The method of claim 1, wherein provisioning the IoT device using the device profile comprises configuring the IoT device to communicate over the network via the first network device and the second network device.

9. The method of claim 1, wherein the tunneling attribute comprises a device-tunneled-redirect instruction for creating the tunnel between the first network device and the second network device.

10. The computer-implemented method of claim 1, wherein the provisioning the IoT device further comprises:

terminating a transmittance of user datagram protocol (UDP) packets from the IoT device; and implementing a transmittance of transmission control protocol (TCP) packets from the IoT device.

11. A system comprising:

a memory comprising instructions; and one or more processors configured to execute the instructions to:

receive, by a network switch in a network, data originated from an Internet-of-Things (IoT) device;

identify a type of the IoT device by analyzing data packets of the received data;

obtain, by the network switch, a device profile for the IoT device, the device profile being used for provisioning the IoT device to access the network; and provision the IoT device using the device profile, wherein provisioning the IoT device comprises identifying a tunneling attribute in the device profile and identifying a constrained application protocol (CoAP) parameter in the device profile;

create a tunnel using the tunneling attribute, wherein the tunnel is between the first network device and a second network device for transmitting the data received from the IoT device; and create a CoAP connection to the IoT device using the CoAP parameter to establish a zero touch provision on one or more device attributes of the IoT device.

12. The system of claim 11, wherein the one or more processors are further configured to execute instructions, which when executed, cause the one or more processors to:

transmit, by the network switch to the network controller, a request to create the tunnel between the network switch and the network controller for transmitting the data from the IoT device;

receive, by the network switch from the network controller, a confirmation that the tunnel between the network switch and the network controller for transmitting the data from the IoT device has been created; and transmit the data received from the IoT device from the network switch to the network controller using the tunnel.

13. The system of claim 11, wherein the instruction to obtain the device profile comprises retrieve the device profile from storage in a memory of the network switch.

14. The system of claim 11, wherein the instruction to obtain the device profile comprises download the device profile from a device profile database of a central management server via a secure networking protocol.

15. The system of claim 14, wherein the instruction to download the device profile comprises transmit a REpresentational State Transfer (REST) query to the central management server via the secure networking protocol.

16. The system of claim 11, wherein the instruction to provision the IoT device using the device profile comprises configure the IoT device to communicate over the network via the network switch and the network controller.

17. The system of claim 11, wherein the instruction to identify the tunneling attribute comprises add, by the network switch, the tunneling attribute to the device profile.

18. The system of claim 11, wherein the tunneling attribute comprises a device-tunneled-redirect instruction for creating the tunnel between the network switch and the network controller.

19. A non-transitory machine-readable storage medium comprising computer executable instructions stored thereon that, when executed by one or more processors within a network switch, cause the one or more processors to:

receive data originated from an Internet-of-Things (IoT) device;

identify a type of the IoT device by analyzing data packets of the received data;

obtain a device profile for the IoT device, the device profile being used for provisioning the IoT device to access the network;

provision the IoT device using the device profile, wherein provisioning the IoT device comprises identifying a tunneling attribute in the device profile and identifying a constrained application protocol (CoAP) parameter in the device profile;

create a tunnel using the tunneling attribute, wherein the tunnel is between the first network device and a second network device for transmitting the data received from the IoT device; and create a CoAP connection to the IoT device using the CoAP parameter to establish a zero touch provision on one or more device attributes of the IoT device.

20. The non-transitory machine-readable storage medium of claim 19, wherein the instructions further cause the one or more processors to:

transmit, by the network switch to the network controller, a request to create the tunnel between the network switch and the network controller for transmitting the data from the IoT device;

receive, by the network switch from the network controller, a confirmation that the tunnel between the network switch and the network controller for transmitting the data from the IoT device has been created; and transmit the data received from the IoT device from the network switch to the network controller using the tunnel; and wherein:

the CoAP connection is created without an input from the network controller.

* * * * *